(12) United States Patent
Kameda (10) Patent No.: US 7,110,064 B2
(45) Date of Patent: Sep. 19, 2006

(54) LIQUID CRYSTAL DIAL HAVING POLARIZING PLATE WITH CUTOUT CORRESPONDING TO TRANSPARENT SECTION OF THE DIAL

(75) Inventor: Tuyoshi Kameda, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 64 days.

(21) Appl. No.: 10/758,284

(22) Filed: Jan. 16, 2004

(65) Prior Publication Data

US 2004/0207771 A1 Oct. 21, 2004

(30) Foreign Application Priority Data

Jan. 20, 2003 (JP) .............................. 2003-011327

(51) Int. Cl.
*G02F 1/1335* (2006.01)

(52) U.S. Cl. .............................. 349/96; 362/23; 349/56

(58) Field of Classification Search ................ 399/129; 349/158, 160, 96; 362/23–20; 329/124
See application file for complete search history.

(56) References Cited

U.S. PATENT DOCUMENTS 5,691,962 A * 11/1997 Schwartz et al. ............. 368/71
6,382,127 B1   5/2002 Wehner
2002/0027620 A1 *  3/2002 Platz et al. .................... 349/27
2003/0123327 A1 *  7/2003 Guanter ........................ 368/82

FOREIGN PATENT DOCUMENTS

| DE | 197 53 928 A1 | 6/1999 |
| EP | 0 926 468 A2 | 6/1999 |
| EP | 1 235 197 A1 | 8/2002 |
| EP | 1 256 515 A2 | 11/2002 |
| JP | 11-271100 A | 10/1999 |

* cited by examiner

Primary Examiner—Andrew Schechter
Assistant Examiner—Phu Vu
(74) Attorney, Agent, or Firm—Foley & Lardner LLP (57) ABSTRACT

A displaying apparatus (10) is configured such that illumination light emitted from light sources (15, 15 . . . ) disposed on a back side of a liquid crystal displaying plate (11) illuminates an optically transparent displaying section (16a) of a dial plate (16) provided on a front side of the liquid crystal displaying plate (11) by passing through the liquid crystal displaying plate (11). Further, polarizing plates (13, 14) overlapping the optically transparent displaying section (16a) are cut out from the liquid crystal displaying plate, whereby the illumination light may illuminate the optically transparent displaying section (16a), passing through a liquid crystal displaying plate (111).

9 Claims, 12 Drawing Sheets

LIQUID CRYSTAL DIAL HAVING POLARIZING PLATE WITH CUTOUT CORRESPONDING TO TRANSPARENT SECTION OF THE DIAL

BACKGROUND OF THE INVENTION

1. Field of the Invention

The present invention relates to a displaying apparatus comprising a liquid crystal displaying part and an analog displaying part.

2. Description of the Related Art

Figure 11A:
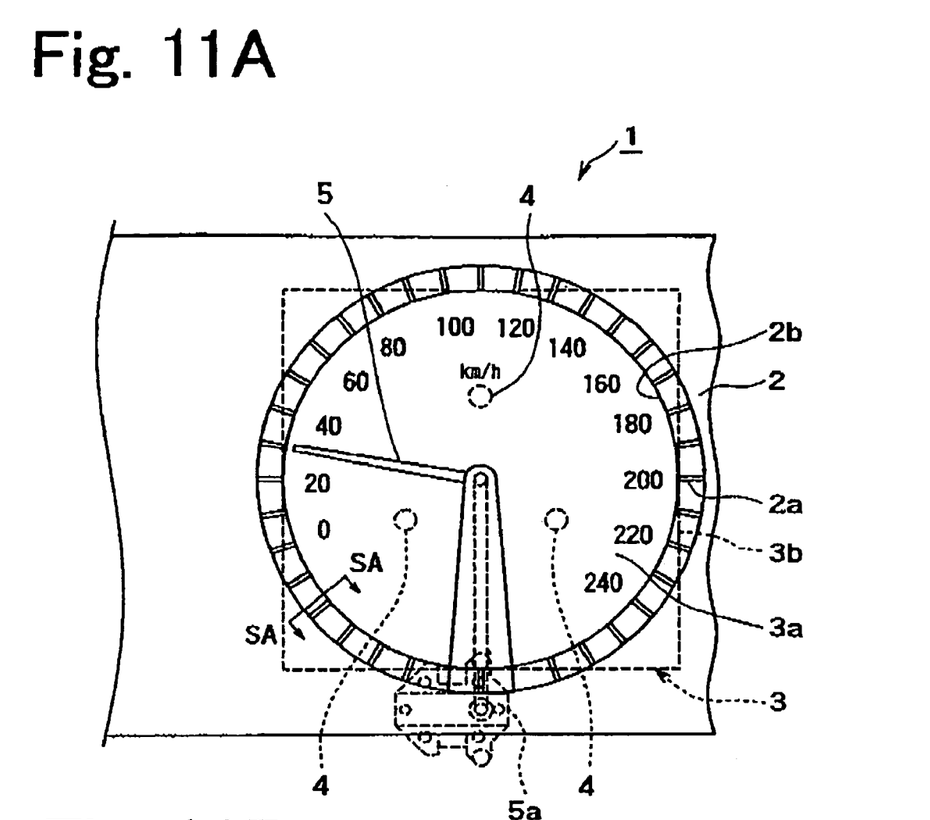
FIG. 11A is a front view illustrating a prior art vehicle displaying apparatus.

There is known as a displaying apparatus of this type one such as a displaying apparatus 1 as illustrated in FIG. 11A.

The displaying apparatus 1 is used for a vehicle meter for example to indicate a vehicle speed and a number of revolutions of an engine, and so on.

The displaying apparatus 1 comprises a dial plate 2 equipped with a scale section 2a, a liquid crystal displaying plate 3 disposed on a back side of dial plate 2, and a light source 4 disposed on a back side of the liquid displaying plate 3 (see Japanese Patent Laid-Open Hei No. 11-271100, 6 to 8 pages, FIG. 1, for example).

In the displaying apparatus 1, a region surrounded by the annular scale section 2a is opened to form a circular window 2b, and a liquid crystal displaying region 3a of the liquid crystal displaying plate 3 is exposed through the circular window 2b in a front surface side of the displaying apparatus for performing liquid crystal display.

The displaying apparatus 1 has a dial pointer 5 driven by a movement 5a. The dial pointer 5 is rotated in a front side of the liquid crystal displaying plate 3 for performing analog display.

In such the displaying apparatus 1, a rectangular liquid crystal displaying plate 3 is adopted, which is mass-produced and inexpensive, and is circulated for a reduced manufacturing cost.

Figure 12:
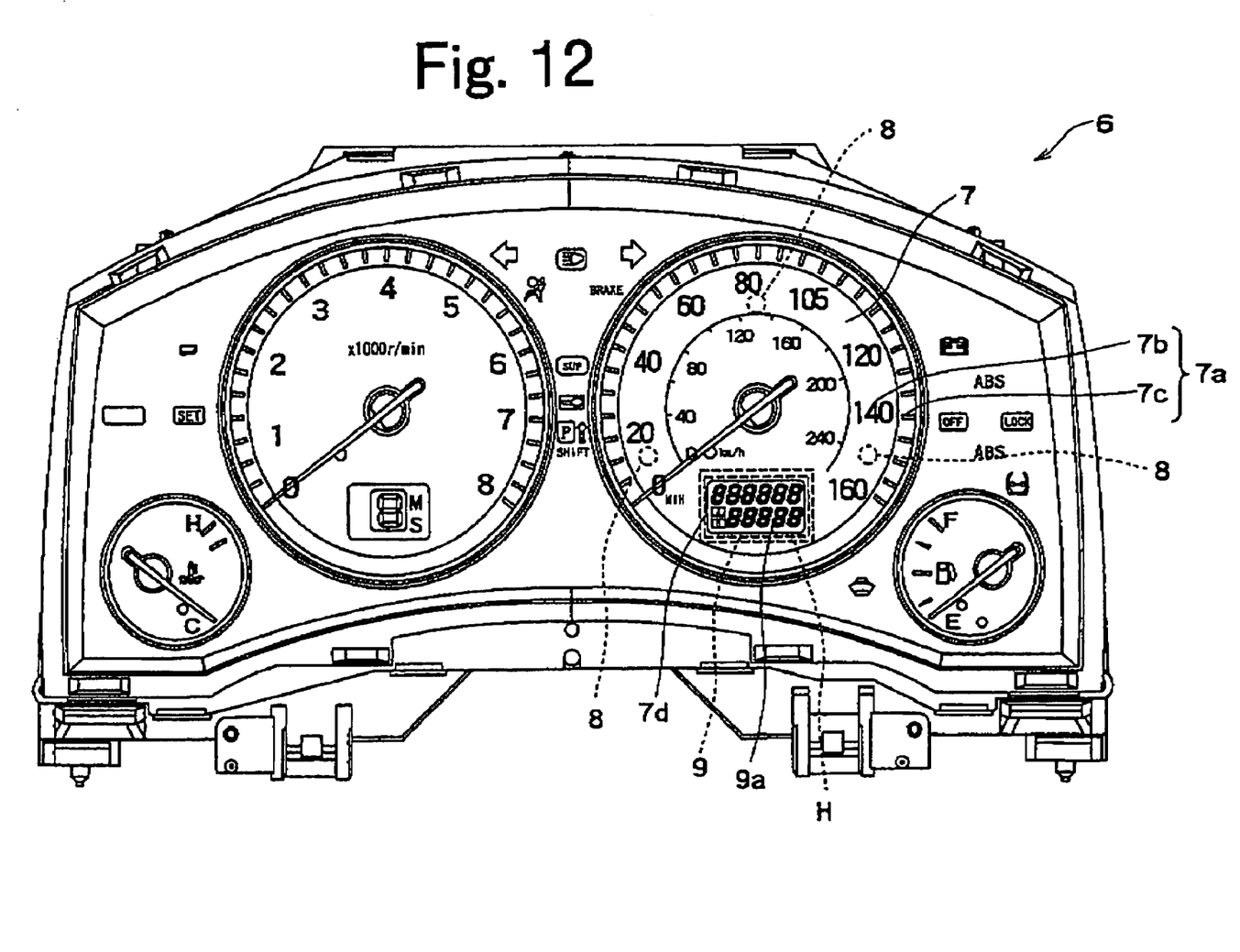
FIG. 12 is a front view illustrating another prior art vehicle displaying apparatus.

There is also known a displaying apparatus 6 illustrated in FIG. 12 as another example of the displaying apparatus of this type.

In the displaying apparatus 6, a dial plate 7 has an optically transparent displaying section 7a including a scale section 7b and a dial section 7c, and a small window 7d provided at a position where it does not overlap the optically transparent displaying section 7a.

The optically transparent displaying section 7a is formed by use of a print of white color and so on, to be transparent for light.

Light sources 8, 8 . . . are provided on a back side of the dial plate 7, and illumination light emitted from the light sources 8, 8 . . . illuminates the optically transparent displaying section 7a through a diffusion plate (not shown).

In the displaying apparatus 6, a square liquid crystal displaying plate 9 is provided facing to the small window 7d.

The displaying apparatus 6 is adapted to expose a liquid crystal displaying region 9a of the liquid crystal displaying plate 9 through the small window 7d for being capable of performing liquid crystal display.

The liquid crystal displaying plate 9 is also held on a holding member H provided at a portion overlapping the dial plate 7 as viewed from a front to prevent it from being exposed from the small window 7d.

However, the conventional displaying apparatus 1 has a difficulty that because the liquid crystal displaying plate 3 is disposed at a position overlapping the scale section 2a, the illumination light emitted from the light sources 4, 4 . . . provided on the back side of the liquid crystal displaying plate 3 is intercepted by the liquid crystal displaying plate 3.

Figure 11B:
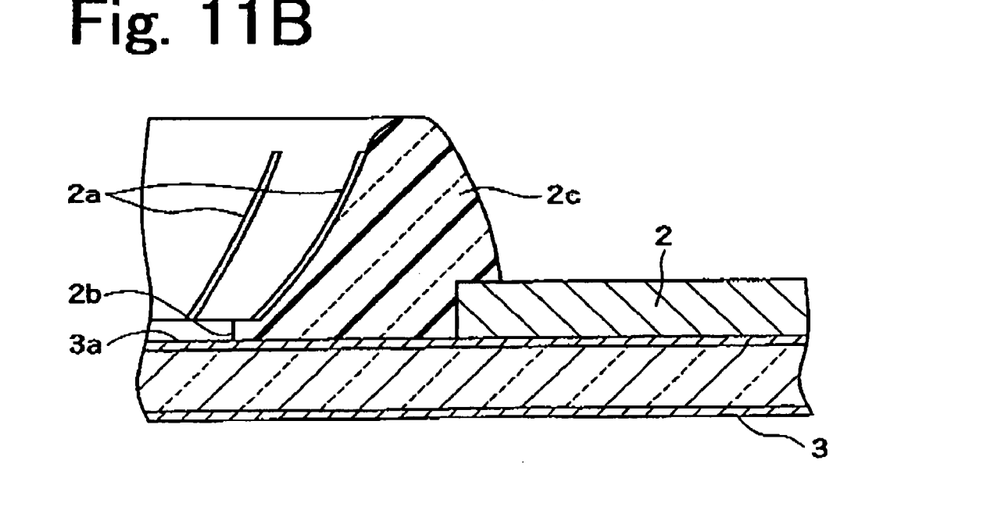
FIG. 11B is across sectional view taken along a line SA—SA in FIG. 11A.

To solve this difficulty the displaying apparatus 1 has to observe the scale section 2a by providing an optical waveguide member 2c separately as illustrated in FIG. 11B and light-emitting the optical waveguide member 2c. Therefore, there is a problem that the number of parts of the displaying apparatus is increased.

There further occurs another problem that since the quantity of light capable of guiding the light through a optical waveguide member 2c is limited, a region capable of illumination is also limited, and hence the flexibility of the design is reduced.

Further, in the displaying apparatus 6, the dial plate 7 at a location corresponding to the position of the disposition of the holding member H are prevented from being illuminated with the illumination light from the light sources 8, 8 . . . .

For this, there occurs a problem that it is impossible to provide the optically transparent displaying section 7a in close vicinity to the small window 7d.

Moreover, when the small window 7d is not square, the area of the liquid crystal displaying plate 9 overlapping the dial plate 7 is increased because of the use of the square liquid crystal displaying plate 9. For this, there occurs a problem of a region where the optically transparent displaying section 7a can not be provided being extended.

Furthermore, in the displaying apparatus 6, when liquid crystal displaying is desired at a plurality of locations by providing a plurality of the small windows 7d, provided that the liquid crystal displaying plate 9 striding the plurality of the small windows 7d is provided, regions among the small windows 7d, 7d . . . can not be illuminated with the light sources 8, 8.

Accordingly, provided that the optically transparent displaying section 7a is provided among the plurality of the small windows 7d, it is necessary to provide a plurality of the liquid crystal displaying plates 9, and hence the manufacturing cost is increased.

SUMMARY OF THE INVENTION

To solve the difficulties with the prior art, it is an object of the present invention to provide a displaying apparatus capable of improving the flexibility of the design, and of reducing the manufacturing cost.

An displaying apparatus according to one of the present invention is characterized in comprising: a liquid crystal displaying plate including a liquid crystal plate and a polarizing plate; a light source disposed on the back side for emitting illumination light; and a dial plate including an optically transparent displaying section through which light can transmit, the foregoing dial plate including a window through which the liquid crystal plate is exposed, the foregoing illumination light transmitting the liquid crystal displaying plate to illuminate the optically transparent displaying section.

With such a construction, there is no need of separately providing an optical waveguide member for illuminating the optically transparent displaying section because the illumination light is adapted to transmit the liquid crystal displaying plate for illuminating the optically transparent displaying section.

Therefore, the number of parts can be reduced, and the manufacturing cost can be lowered.

Further, even when the liquid crystal displaying plate is adapted to overlap the optically transparent displaying section, the foregoing illumination light transmits the liquid crystal displaying plate to illuminate the optically transparent displaying section, so that the window is disposed at a desired position to expose the liquid crystal displaying plate. Hereby, the flexibility of the design can be improved.

A displaying apparatus in accordance with another aspect of the present invention is characterized in that the aforementioned polarizing plate is cut out at a portion thereof which overlaps the optically transparent displaying section as viewed frontally.

Since with this construction, the aforementioned polarizing plate has a cutout portion overlapping the optically transparent displaying section as viewed frontally, even if use is made of a light source emitting weak illumination light which can not be transmitted by the polarizing plate, it is possible to illuminate the optically transparent displaying section by transmitting the illumination light by the liquid crystal displaying plate.

It is therefore possible to reduce the manufacturing cost without increasing the number of the light sources and/or employing a light source with a large quantity of emitted light.

A displaying apparatus according to further another aspect of the invention is characterized in that the aforementioned liquid crystal displaying plate covers the entire of the back of the optically transparent displaying section.

With this construction, the aforementioned liquid crystal displaying plate covers the entire of the back of the optically transparent displaying section, and the liquid crystal holding member for holding an outer peripheral edge of the liquid crystal displaying plate and the optically transparent displaying section are prevented from overlapping.

Accordingly, even when the foregoing optically transparent displaying section is disposed in close vicinity to the window, the liquid crystal holding member is prevented from intercepting the illumination light.

It is therefore possible to dispose the optically transparent displaying section and the window at a desired position, and improve the flexibility of the design.

Additionally, since the liquid crystal displaying plate covers the entire of the optically transparent displaying section, even if the plurality of windows are provided, the liquid crystal display by the plurality of the windows is assured with only the one liquid crystal displaying plate. It is thus possible to reduce the number of parts, and reduce the manufacturing cost.

A displaying apparatus in accordance with still another aspect of the present invention is characterized in that the peripheral edge of the liquid crystal displaying plate has an overlapping edge portion overlapping the optically transparent displaying section as viewed frontally.

With this construction, even when the aforementioned optically transparent displaying section is provided extending to stride the peripheral edge of the liquid crystal displaying plate, and overlap the foregoing peripheral edge, the liquid crystal holding member does not intercept the illumination light toward the optically transparent displaying section because the section thereof overlapping the overlapping edge section is cut out.

Accordingly, even when the liquid crystal displaying plate is provided on only a necessary portion to permit the foregoing optically transparent displaying section and the foregoing peripheral edge to be overlapped, the liquid crystal holding member does not intercept the illumination to the optically transparent displaying section. Thus, the liquid crystal displaying plate with a smaller area can be adopted, and hence the manufacturing cost can be reduced.

A displaying apparatus in accordance with still further another aspect of the present invention is characterized in that the peripheral edge of the liquid crystal displaying plate has an overlapping edge portion overlapping the optically transparent displaying section as viewed frontally, and the liquid crystal holding member for holding the foregoing peripheral edge comprises an optically transparent member in its portion overlapping the foregoing overlapping edge portion as viewed frontally.

With this construction, even when the aforementioned optically transparent displaying section is provided extending to stride the peripheral edge of the liquid crystal displaying plate, and overlap the foregoing peripheral edge, the liquid crystal holding member does not intercept the illumination light to the optically transparent displaying section.

Accordingly, even when the liquid crystal displaying plate is provided on only a necessary portion to permit the foregoing optically transparent displaying section and the foregoing peripheral edge to be overlapped, the liquid crystal holding member does not intercept the illumination to the optically transparent displaying section. Thus, the liquid crystal displaying plate with a smaller area can be employed, and hence the manufacturing cost can be reduced.

DETAILED DESCRIPTION OF THE PREFERRED EMBODIMENTS

The present invention will be described on the basis of preferred embodiments with reference to the accompanying drawings below.

"Preferred Embodiment 1"

Figure 1:
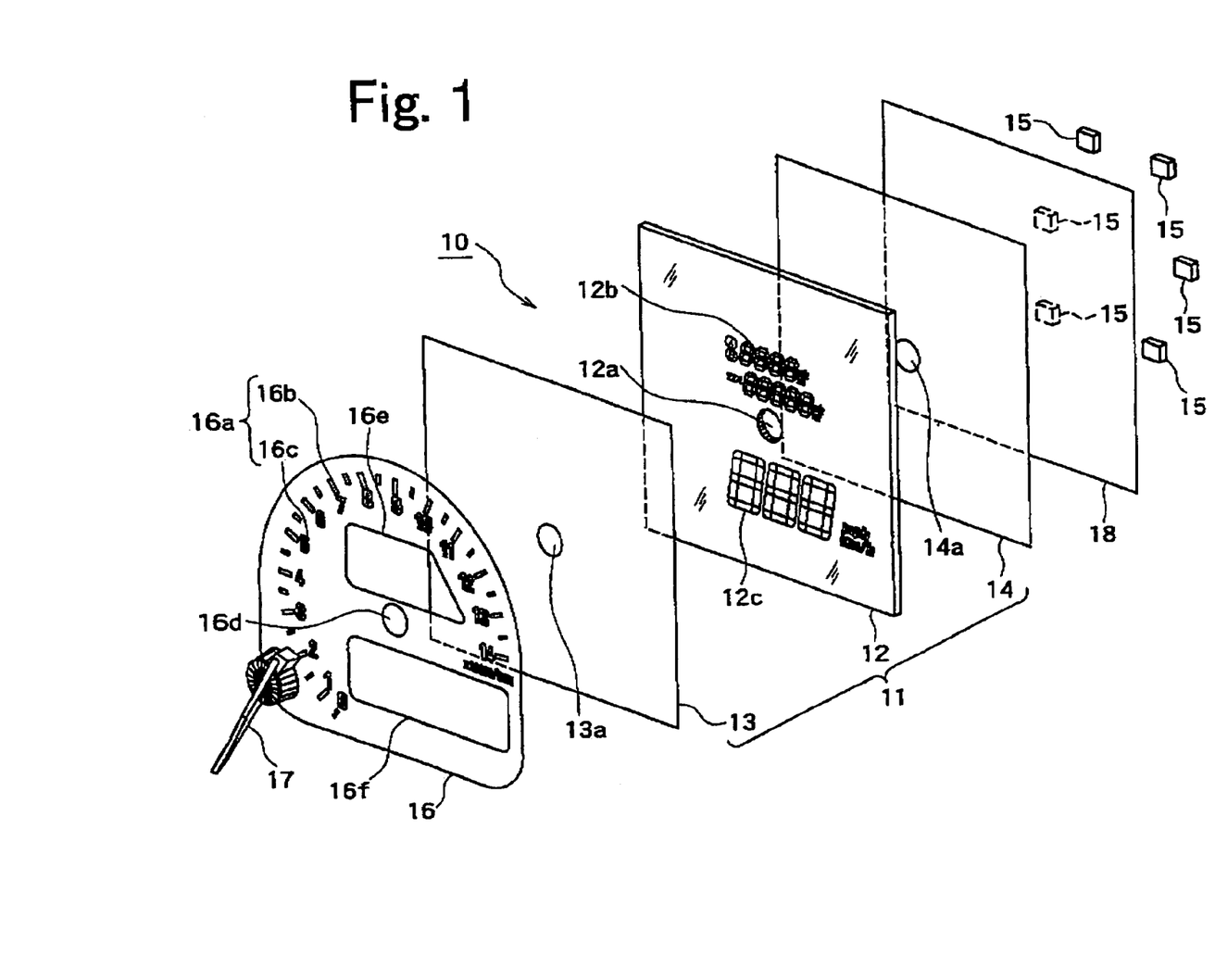
FIG. 1 is an exploded perspective view of a vehicle displaying apparatus associated with an embodiment 1 of the present invention.

Referring to FIG. 1, a displaying apparatus 10 in an embodiment 1 is illustrated. The displaying apparatus 1 comprises: a liquid crystal displaying plate 11 including a liquid crystal plate 12 and polarizing plates 13, 14, LEDs 15, 15 . . . as light sources each disposed on a back side of the liquid crystal displaying plate 11, and a dial plate 16 disposed on a front side of the liquid crystal displaying plate 11. In the present embodiment 1, the displaying apparatus 10 is employed as a display for a tachometer of a vehicle.

The dial plate 16 is a D-shaped thin plate with its upper portion formed into a circular arc shape as viewed from a front.

The dial plate 16 includes an optically transparent displaying section 16a capable of light transmission and formed by a print passing through light.

In the present embodiment 1, the optically transparent displaying section 16a is formed with a colored printing of red, orange, and green, etc.

Figure 2:
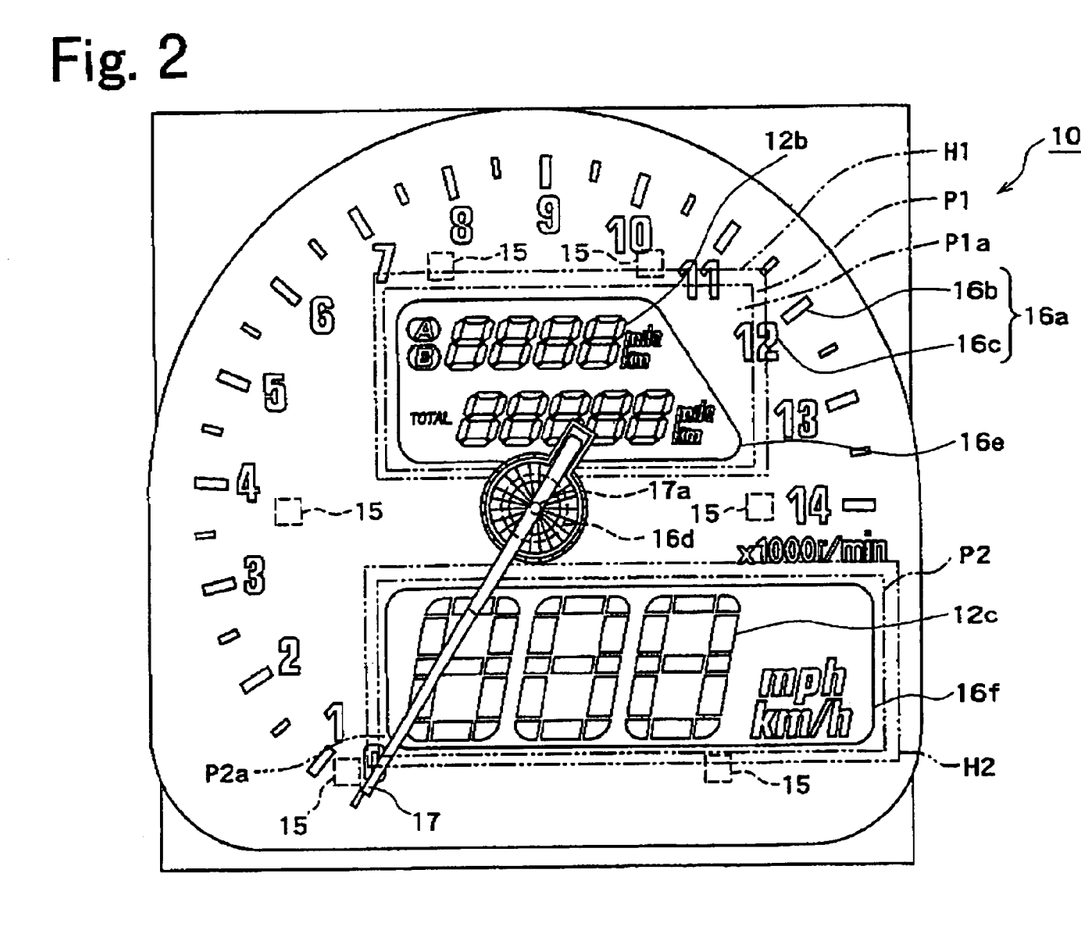
FIG. 2 is a front view illustrating the vehicle displaying apparatus associated with the embodiment 1 of the present invention.

The optically transparent displaying section 16a comprises a dial section 16b and a dial section 16c, and the scale section 16b is formed into an annular shape extending from a left lower portion of the dial plate 16 to a right central portion of the same in FIG. 2.

The dial section 15c arranges a numeral "0" as a zero point at a lower end portion of the scale section 16b, and increases numerals up to a numeral "14" clockwise along the scale section 16b to construct an analog display.

The dial plate 16 has a shaft hole 16d at a center of a ring formed by the scale section 16b.

A pointer shaft 17a driven by a movement (not shown) is protruded to the front side from the shaft hole 16d, and a dial pointer 17 is attached to the pointer shaft 17a.

The dial plate 16 includes a first window 16e and a second window 16f as window sections formed with a plurality of, for example, two openings for exposing the liquid crystal displaying plate 11.

The first window 16e is formed with a trapezoidal opening provided above the shaft hole 16d, and a lower side of the opening is protruded to a more right side from an upper side of the same, and is extended to the neighborhood of a numeral "13" at a right side end of the dial section 16c.

In contrast, the second window 16f is formed with a rectangular opening provided below the shaft hole 16d, and has a right lower corner portion positioned in the neighborhood of a numeral "0" of the dial section 16c.

The liquid crystal plate 12 is formed with transparent plates such as opposing two glass plates, two transparent electrodes such as a tin oxide film and an ITO (indium-tin oxide) film held between inner surfaces of the two transparent plates, and a liquid crystal layer held between the two transparent electrodes. The liquid crystal plate 12 is therefore substantially colorless and transparent.

As illustrated in FIG. 1, the liquid crystal plate 12 has a shaft hole 12a provided at a generally center of the liquid crystal plate 12, which hole overlaps the shaft hole 16d in the dial plate 16 as viewed frontally.

The liquid crystal plate 12 comprises a first liquid crystal displaying section 12b provided above the shaft hole 12a, and a second liquid crystal displaying section 12c provided below the shaft hole 12a.

The first liquid crystal displaying section 12b is disposed at a position corresponding to the first window 16e, and is exposed to a front surface side from the first window 16e.

The second liquid crystal displaying section 12c is disposed at a position facing to the lower second window 16f, and is exposed to a front surface side from the second window 16f.

In contrast, the polarizing plates 13, 14 have shaft holes 13a, 14a at positions overlapping the shaft hole 12a, respectively.

The liquid crystal plate 12 is held between the polarizing plates 13, 14 to construct the liquid crystal displaying plate 11 which covers the entire of the back surface of the transparent displaying section 16a.

The liquid crystal displaying plate 11 allows the transmission of a predetermined quantity of light in a state where no control voltage is applied thereto to maintain its semi-transparent state.

The liquid crystal displaying plate 11 comprises the first liquid crystal displaying sections 12b, 12c, and is intercepted from light when predetermined control voltage is applied thereto though the transparent electrode to exhibit black-colored display.

In the displaying apparatus 10 in the present embodiment, there are provided a plurality of, for example, six LEDs 15, 15 . . . , which can illuminate the optically transparent displaying section by forcing the liquid crystal displaying plate 11 to transmit emitted illumination light.

A diffusion plate 18 is provided between the LEDs 15, 15 . . . and the liquid crystal displaying plate 11 for making uniform the illumination light, and the illumination light emitted from the LEDs 15, 15 . . . is irradiated to the front surface side through the diffusion plate 18.

Hereinafter, an operation of the displaying apparatus 10 in the present embodiment having the aforementioned construction will be described.

In the displaying apparatus 10, there are provided as light sources, six LEDs 15, 15 . . . capable of permitting the liquid crystal displaying plate 11 to transmit emitted illumination light to illuminate the optically transparent displaying section.

The displaying apparatus 10 constructed as described above can illuminate the optically transparent displaying section 16a by passing through the liquid crystal displaying plate 11 to transmit the illumination light emitted from the LEDs 15, 15 . . . .

Accordingly, in the displaying apparatus 10 in the present embodiment there is no need of separately providing the optical waveguide member for illuminating the optically transparent displaying section 16a, an hence the number of parts can be reduced, and the manufacturing cost can be reduced.

Further, for example, provided that as in the comparison example 1 as indicated by a two-dot chain line in FIG. 2 rectangular liquid crystal displaying plates P1, P2 are disposed at positions corresponding to the first window 16e and the second window 16f, the optically transparent displaying section 16a located in the vicinity of the first window 16e and the second window 16f overlaps displaying section peripheral sections P1a, P2a of the liquid crystal displaying plates P1, P2.

More specifically, in the comparison example 1 the displaying section peripheral section P1a overlaps numerals "11" and "12" in the optically transparent displaying section 16a, and the displaying section peripheral section P2a overlaps a numeral "0" in the optically transparent displaying section 16a.

Further, in the comparison example 1, since it is impossible to illuminate the optically transparent displaying section 16a overlapping the displaying section peripheral sections P1a, P2a with the foregoing illumination light, it is impossible to dispose the first window 16e and the second window 16f in the vicinity of the optically transparent displaying section 16a.

Particularly, when the foregoing window is configured into a different shape from a rectangular one as that of the first window 16e, in the comparison 1 the area of the displaying section peripheral section P1a is increased, and the range of the disposition of the optically transparent displaying section 16a is more limited.

Furthermore, in the comparison 1 holding members H1, H2 are provided for holding the liquid crystal displaying plates P1, P2, and hence the optically transparent displaying section 16a cannot be disposed at positions where it overlaps the holding members H1, H2.

In comparison with this, since in the displaying apparatus 10 in the present embodiment the optically transparent displaying section 16a is illuminated with the illumination light emitted from the LED, LED . . . , passing through the liquid crystal displaying plate 11, the first window 16e and the second window 16f into desired shapes can be disposed in the vicinity to the optically transparent displaying section 16a to improve the flexibility of the design.

Since, in the displaying apparatus 10, the liquid crystal displaying plate 11 covers the entire of the dial plate 16, it is possible to provide a plurality of the first window 16e and second window 16f only with the one liquid crystal displaying plate 11. Hereby, the number of parts can be reduced, and the manufacturing cost can be reduced.

Furthermore, one control driver can control the liquid crystal displaying sections 12b, 12c, and hence the manufacturing cost can be reduced if only the one liquid crystal displaying plate 11 is employed.

Figure 3:
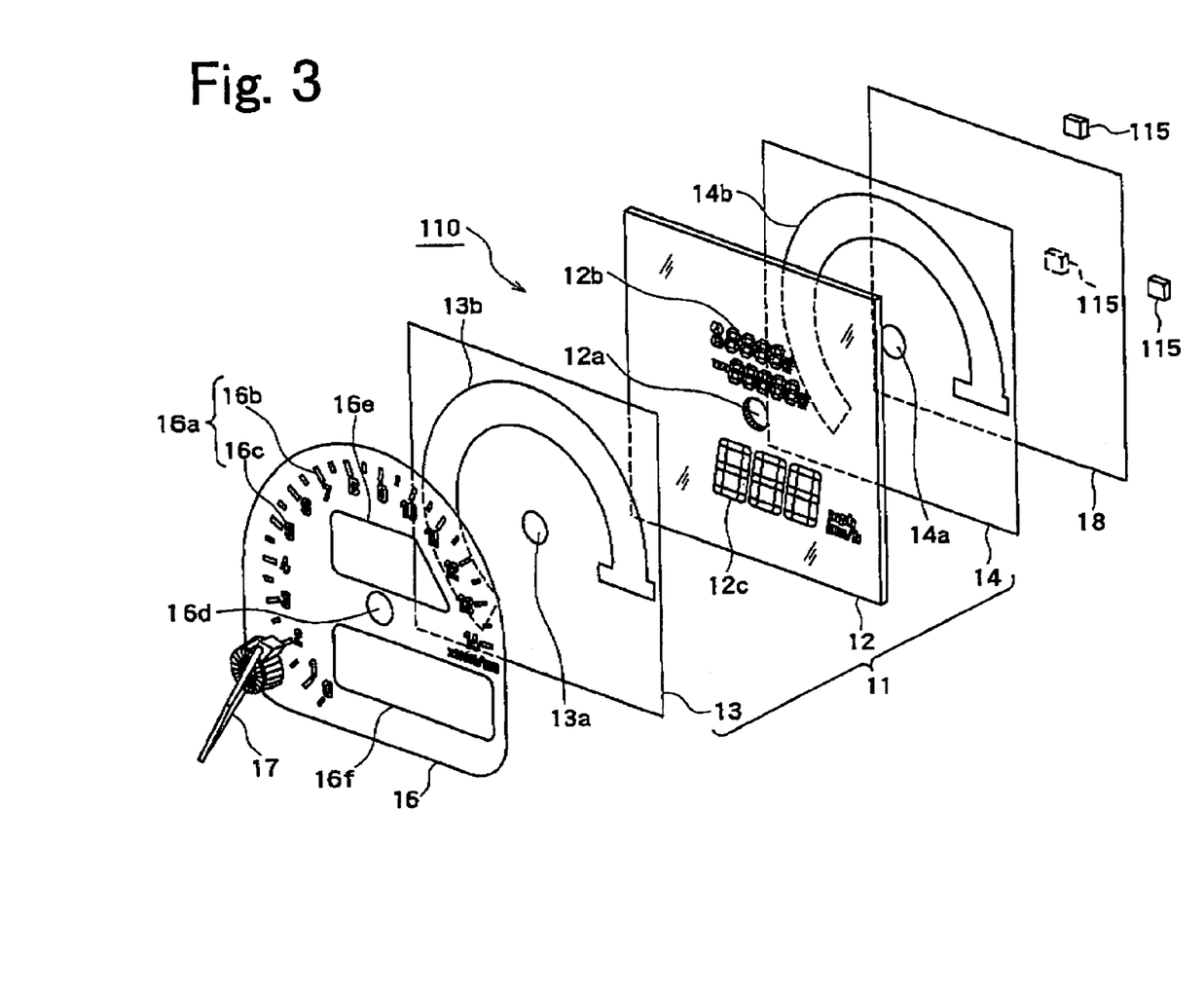
FIG. 3 is an exploded perspective view illustrating a vehicle displaying apparatus associated with a modified example of the embodiment 1 of the present invention.
Figure 4:
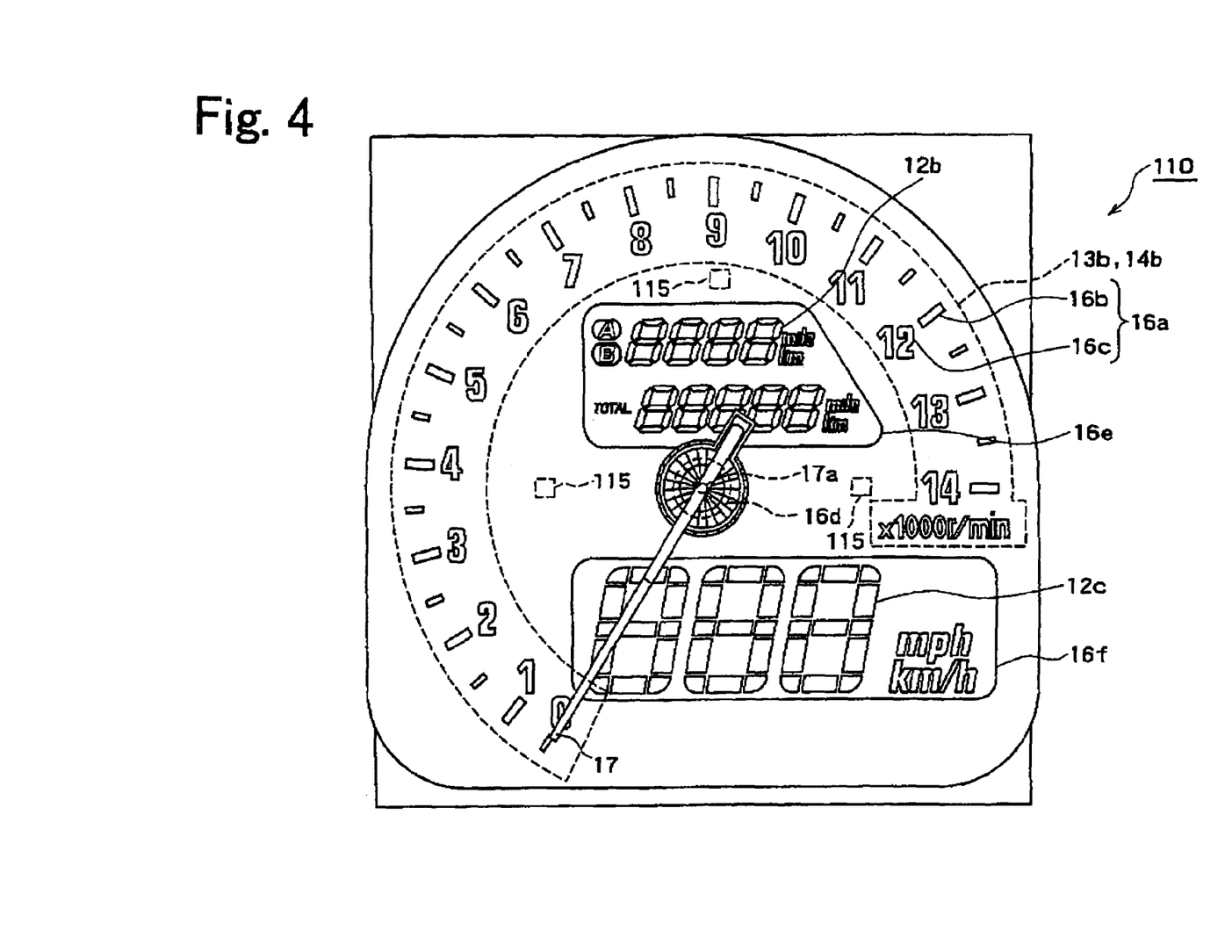
FIG. 4 is a front view illustrating the vehicle displaying apparatus associated with the modified example of the embodiment 1 of the present invention.

Referring now to FIGS. 3 and 4, a modified example of the embodiment 1 of the present invention is illustrated. For the same or equal portions as those in the aforementioned embodiment 1 same symbols shall be applied for the description. In the displaying apparatus 110 in the present modified example, for example, three LEDs 115, 115 . . . are provided as light sources, as illustrated in FIG. 3.

The polarizing plates 13, 14 of the displaying apparatus 10 are cut out at their portions overlapping the optically transparent displaying section 16a as viewed frontally.

More specifically, as illustrated in FIG. 4, there are formed cutouts 13b, 14b at least including a position overlapping the optically transparent displaying section 16a as viewed frontally.

These cutouts 13b, 14b have the same band shape, and are formed annularly in the polarizing plates 13, 14 from a left lower portion of the polarizing plates 13, 14 to a right side center portion of the same.

The displaying apparatus 110 has the cutouts 13b, 14b formed at the portion overlapping the optically transparent displaying section 16a, so that the optically transparent displaying section 16a can be illuminated with the illumination light emitted from the LEDs 115, 115 . . . by passing through the liquid crystal displaying plate 11 to transmit the illumination light.

Further, the polarizing plates 13, 14 at the position overlapping the optically transparent displaying section 16a are cut out, so that the quantity of attenuation of the light transmitted is little. Therefore, the optically transparent displaying section 16a can be illuminated even with the use of LEDs 115, 115 . . . with the reduced quantity emitted light (low brightness).

Accordingly, in the displaying apparatus 110 in the present modified example the number of the LEDs 115, 115 can be reduced or LEDs 115, 115 . . . with the reduced quantity of the emitted light can be employed. Hereby, the manufacturing cost can be reduced.

Although the illumination light transmitted by the polarizing plates 13, 14 presents a light green color, in the displaying apparatus 110 in the present modified example the optically transparent displaying section 16a is illuminated without interposing the polarizing plates 13, 14, so that the optically transparent displaying section 16a can be illuminated with white colored illumination light.

For this, the optically transparent displaying section 16a can exhibit a display with white color, and hence the flexibility of the design is further improved.

Since other constructions, workings, and effects are the same or equivalent to the aforementioned embodiment, the description will be omitted.

"Embodiment 2"

Referring to FIGS. 5 to 8, an embodiment 2 of the present invention is illustrated.

Figure 5:
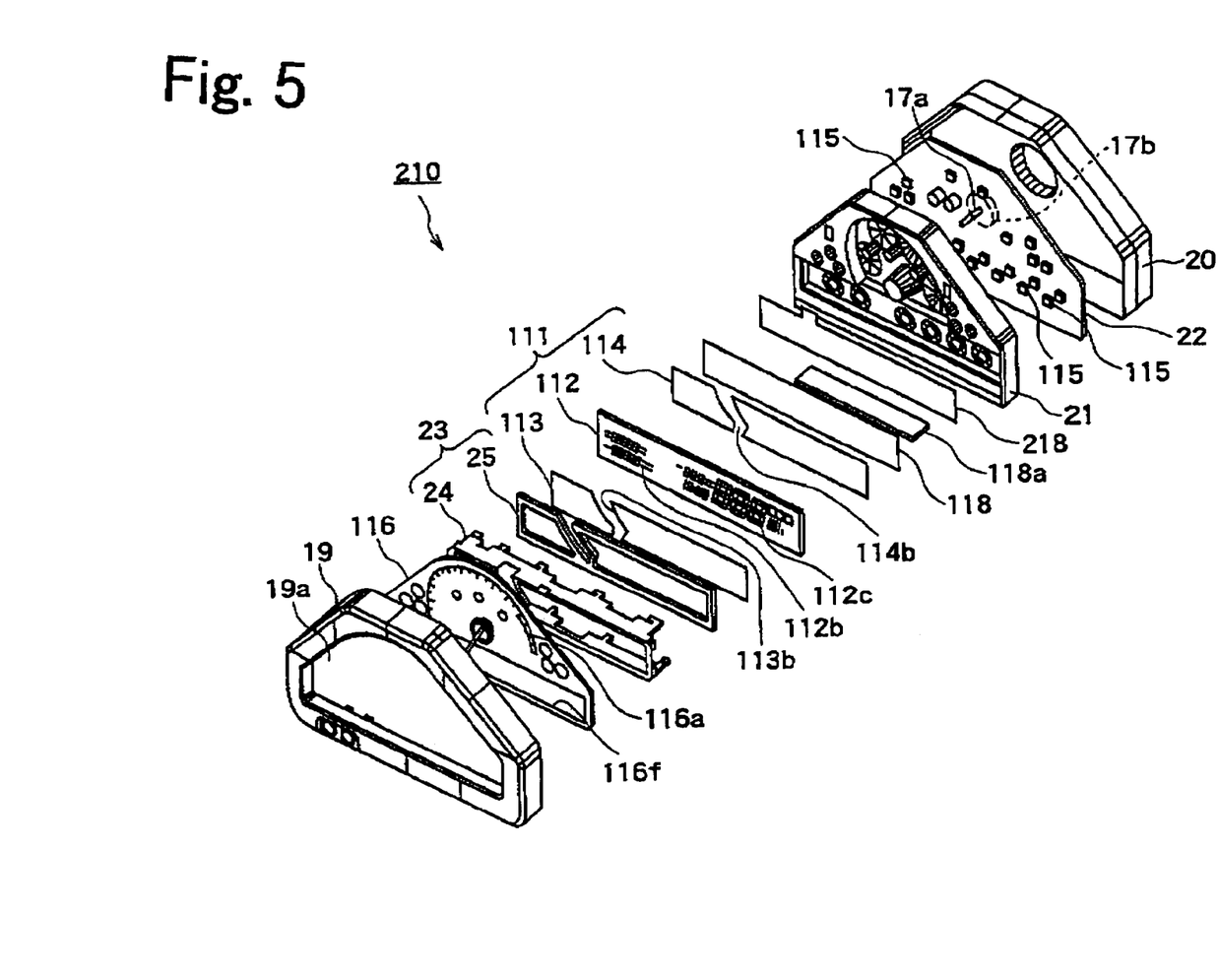
FIG. 5 is an exploded perspective view illustrating a vehicle displaying apparatus associated with an embodiment 2 of the present invention.

As illustrated in FIG. 5, a displaying apparatus 210 as a vehicle displaying apparatus in the embodiment 2 comprises a front cover 19 having a front surface opening 19a, an end cover 20 for covering a back side of the front cover 19 to form a housing of the displaying apparatus 210, a liquid crystal displaying plate 111 composed of a liquid crystal plate 112 and polarizing plates 113, 114, an optical waveguide member 21 disposed on a back side of the liquid crystal displaying plate 111, a substrate 22 disposed on a back side of the optical waveguide member 21, and a dial plate 116 disposed on a front side of the liquid crystal displaying plate 111.

The displaying apparatus 210 includes a liquid crystal holding member 23, which comprises a frame 24, and a resilient packing 25 interposed between the frame 24 and the liquid crystal displaying plate 111.

Figure 6:
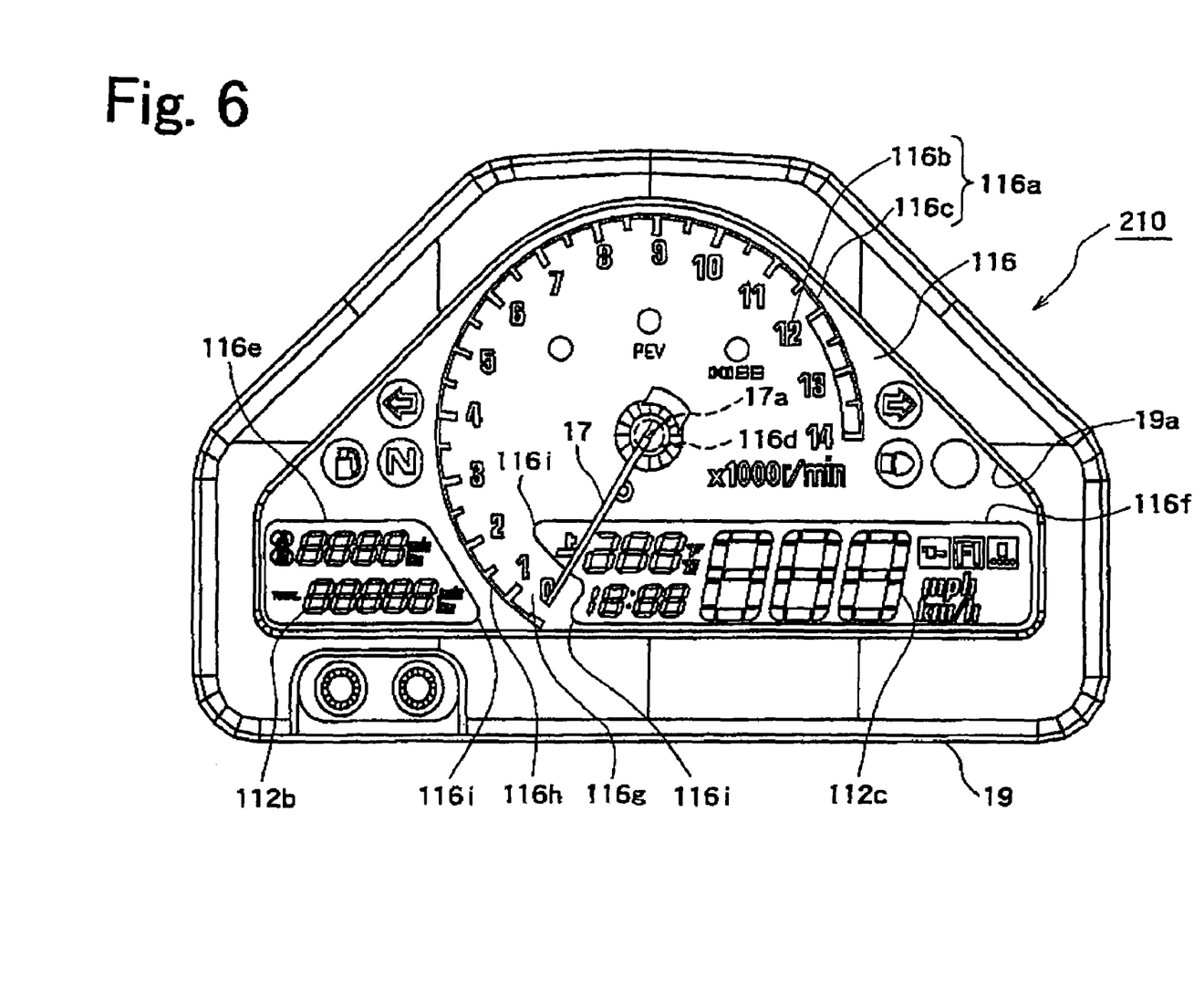
FIG. 6 is a front view illustrating the vehicle displaying apparatus associated with the embodiment 2 of the present invention.

The dial plate 116 exhibits a substantially triangular configuration as illustrated in FIG. 6, and includes an optically transparent displaying section 116a formed by a print for performing the transmission of light.

The optically transparent displaying section 116a includes a scale section 116b and a dial section 116c, and the scale section 116b is provided annularly in the dial plate 116 from the neighborhood of a lower center portion of the dial plate 116 to a right side center portion.

The dial section 116c arranges a numeral "0" at a lower end of the scale section 116b as a zero point, and increases the numeral up to a numeral "14" clockwise along the scale section 116b to complete the index of the analog display.

The dial plate 116 has a shaft hole 116d provided at a center of a ring formed by the scale section 116b.

Further, the pointer shaft 17a driven by the movement 17b, which is provided on a back side of the substrate 22 is projected from the shaft hole 116d to the front side.

The pointer 17 is attached to the pointer shaft 17a, and the analog display is achieved by allowing the pointer 17 to rotate on the front side of the dial plate 116.

In the dial plate 116 there are provided a first window 116e and a second window 116f as windows formed with a plurality of, for example, two openings for exposing the liquid crystal displaying plate 110.

The first window 116e and the second window 116f are provided in a band shape so as to go along the lower side of the dial plate 116, and a bridging section 116g is provided between the first window 116e and the second window 116f.

On the bridging section 116g there is disposed an extension section 116h of the optically transparent displaying section 116a.

More specifically, the extension section 116h is extend in a right lower direction in FIG. 6, and the band shaped bridging section 116g is formed around the extension section 116h, and further acute-angle sections 116i, 116i . . . are formed in the first window 116e and the second window 116f.

Figure 7:
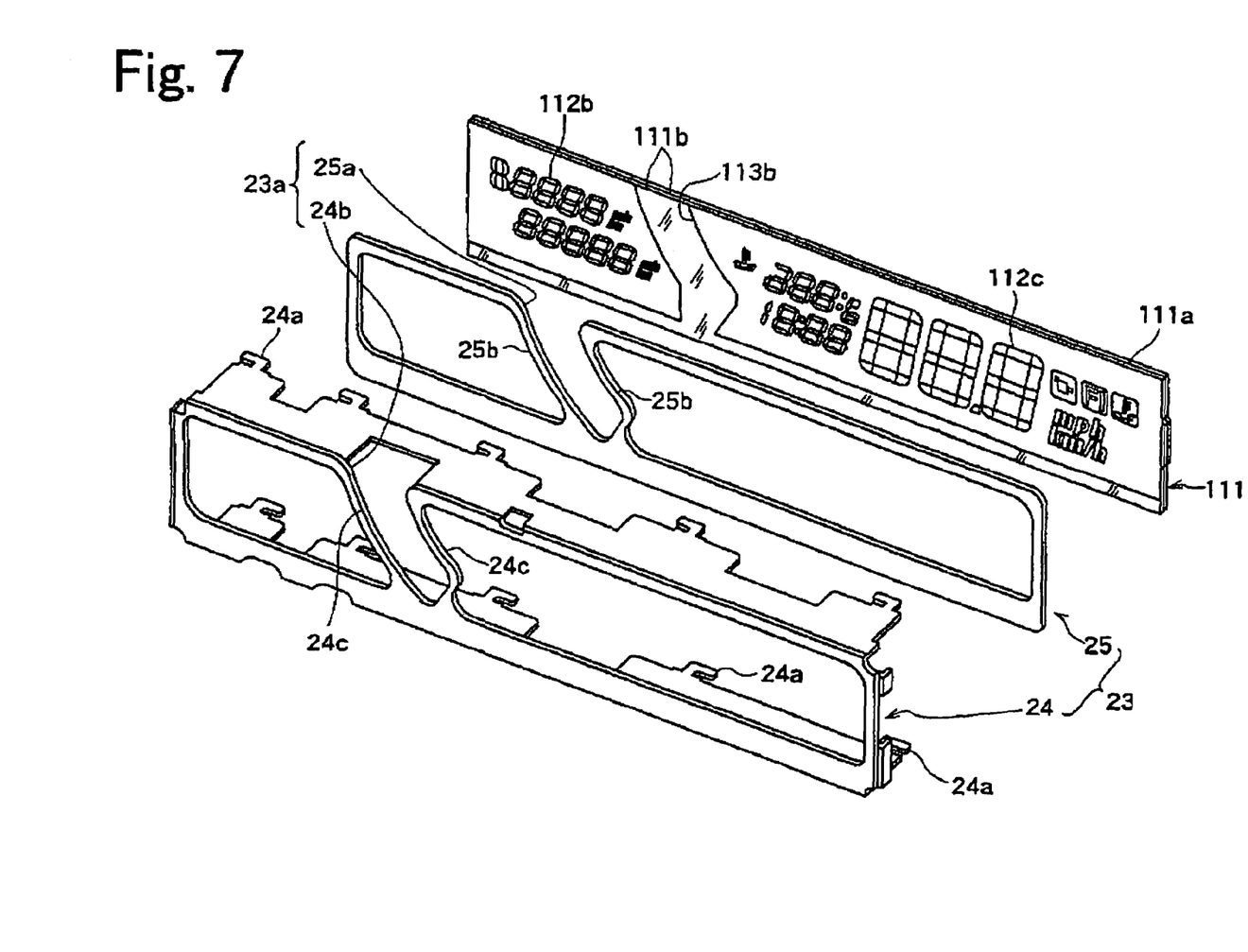
FIG. 7 is a partial perspective view illustrating the vehicle displaying apparatus of the present invention.

As illustrated in FIG. 7, the liquid crystal plate 112 exhibits a band shape, and includes a first liquid crystal displaying section 112b provided in its left side area, and a second liquid crystal displaying section 112c provided in a right side area from substantially the center.

Figure 8:
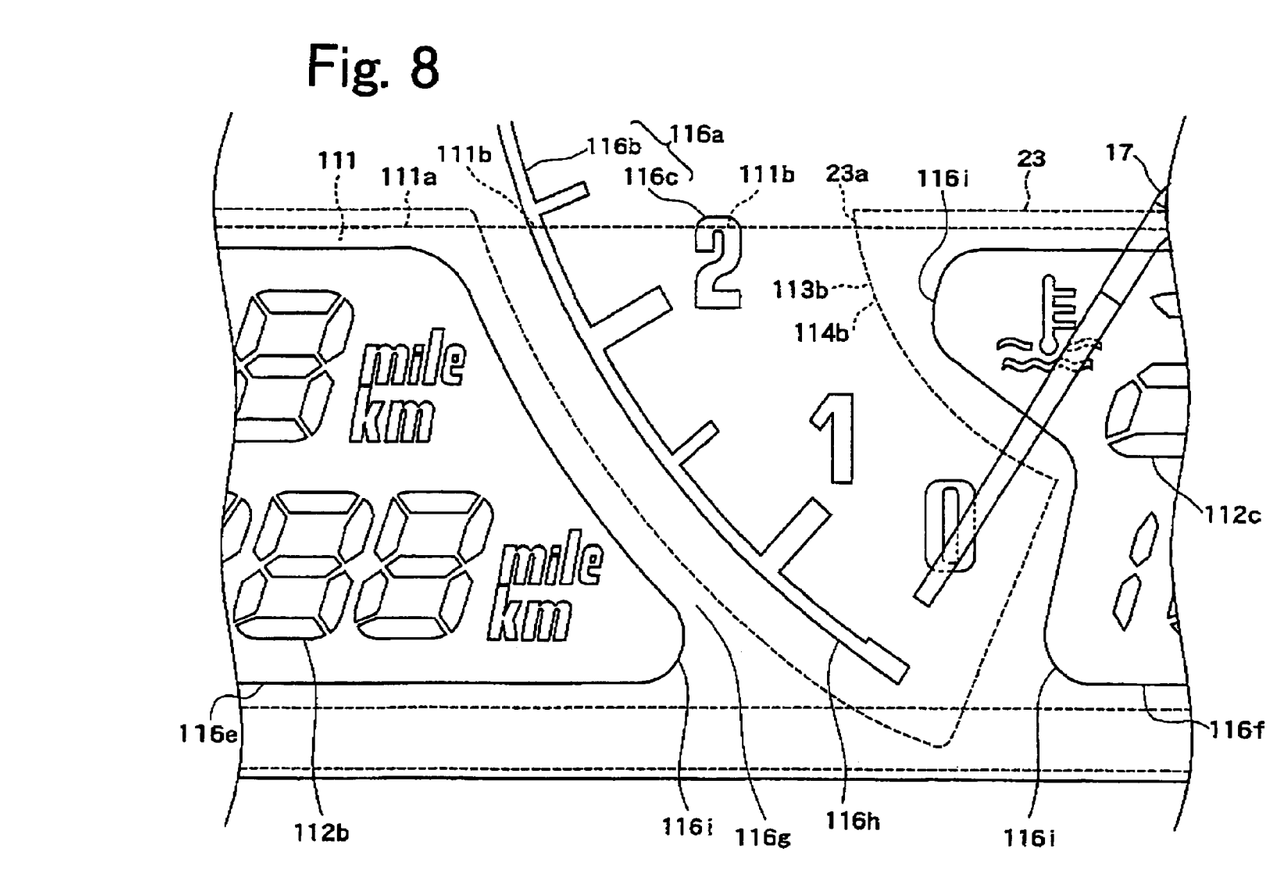
FIG. 8 is an expanded front view illustrating the vehicle displaying apparatus associated with the embodiment 2 of the present invention.

As illustrated in FIGS. 7 and 8, the liquid crystal plate 112 is held between the polarizing plates 113 and 114 to construct the liquid crystal displaying plate 111, and the liquid crystal displaying plate 111 is assembled from the back side so as to stride the first window 116e and the second window 116f.

In the assembled state, the first liquid crystal displaying section 112b is disposed at a position corresponding to the first window 116e, and the displaying apparatus 210 exposes the first liquid crystal displaying section 112b to the front side from the first window 116e for assurance of liquid crystal displaying.

Likewise the first liquid crystal displaying section 112b, the second liquid crystal displaying section 112c is disposed at a position corresponding to the second window 116f, and the displaying apparatus 210 exposes the second liquid crystal displaying section 112c to the front side from the second window 116f for assurance of liquid crystal displaying. A peripheral edge 111a of the liquid crystal displaying plate 111 includes overlapping edge sections 111b, 111b overlapping the optically transparent displaying section 116a.

The polarizing plates 113, 114 of the displaying apparatus 210 are cut out at portions overlapping the optically transparent displaying section 16a as viewed frontally to construct cutouts 113b, 114b.

The cutouts 113b, 114b exhibit a band shape extending in a right lower direction along the bridging section 116g.

Moreover, as illustrated in FIG. 5, the LEDS 115, 115 . . . are provided on the substrate 22, and the LEDs 115, 115 . . . can emit the illumination light toward the front surface from a plurality of light emission small holes provided in the optical waveguide member 21.

Between the LEDs 115, 115 . . . and the liquid crystal displaying plate 111 there are provided a first diffusion plate 118 for making the illumination light uniform and a second diffusion plate 218 disposed on a back side of the first diffusion plate 118 via the support plate 118a.

The liquid crystal holding member 23 is provided on the peripheral edge 111a of the liquid crystal displaying plate 111, and stopper pieces 24a, 24a . . . of the frame 24 are engaged with the substrate 22, whereby the liquid crystal holding member 23 positions and holds the liquid crystal displaying plate 111.

The liquid crystal holding member 23 allows an overlapping edge correspondence section 23a to overlap the overlapping edge section 111b as viewed from a front is cut out.

More specifically, as illustrated in FIGS. 7 and 8, the overlapping edge correspondence section 23a comprises a frame cutout section 24b and a packing cutout section 25a at least including a position overlapping the extension section 116g of the optically transparent displaying section 116a as viewed a front.

The frame cutout section 24b is formed in the frame 24, and frame intermediate reinforcing sections 24c, 24c are extended in a right lower direction from opposite ends of the frame cutout section.

The packing cutout section 25a is formed in the packing 25, and packing intermediate reinforcing sections 25b, 25b having the same shape as the frame intermediate reinforcing sections 24c, 24c are extended in the right lower direction from the opposite ends of the packing cutout section 25a.

In the displaying apparatus 210 constructed as described above, as illustrated in FIG. 8, the frame cutout section 24b and the packing cutout section 25a of the liquid crystal holding member 23 substantially overlap the cutout sections 113b, 114b in the liquid crystal displaying plate 111.

In the following, the action of the displaying apparatus 210 will be described.

Since in the displaying apparatus 210 in the present embodiment 2, the polarizing plates 113, 114 located at the position overlapping the extension section 116h of the optically transparent displaying section 116a are cut out, the illumination light emitted from the LEDs 115, 115 . . . can illuminate the extension section 116h after transmitting through the liquid crystal displaying plate 111.

Further, since the illumination light is transmitted by cutting out the polarizing plates 113, 114 located at the position corresponding to the extension section 116h, the quantity of the attenuation of the illumination light is little even after the transmission through the liquid crystal displaying plate, and hence the illumination light emitted from the LEDS 115, 115 . . . can illuminate the optically transparent displaying section 16a even if its quantity is little.

For this, the number of the LEDs 115, 115 can be reduced, or LEDs 115, 115 . . . with the less quantity of the illumination light (low brightness) can be adopted. Therefore, the manufacturing cost can be reduced.

Although the illumination light transmitted by the polarizing plates 113, 114 exhibits light green color, the illumination light illuminates the extension section 116h without interposing the polarizing plates 113, 114, so that the extension section 116h can be illuminated with white-colored illumination light.

Therefore, the extension section 116h can be indicated with a white color, and hence the flexibility of the design is improved.

Although in the displaying apparatus 210, the liquid crystal displaying plate 111 is provided, striding the back side of the windows 116e, 116f and the peripheral edge 111a and the extension 116h overlap, the overlapping edge correspondence section 23a provided in the peripheral edge 111a is cut out, so that the illumination light emitted from the LEDs 115, 115 . . . can illuminate the extension section 116h of the optically transparent displaying section 116a.

Provided that the displaying apparatus 210 in the present embodiment 2 is employed in such a manner, the peripheral edge 111a of the liquid crystal displaying plate 111 can be overlapped on the optically transparent displaying section 116a, so that the liquid crystal displaying plate 111 with a small area can be adopted, and hence the manufacturing cost can be reduced.

Further, provided that the displaying apparatus 210 is employed, the windows 116e, 116f are configured into desired shapes and are brought into close contact with the optically transparent displaying section 116a.

Figure 9:
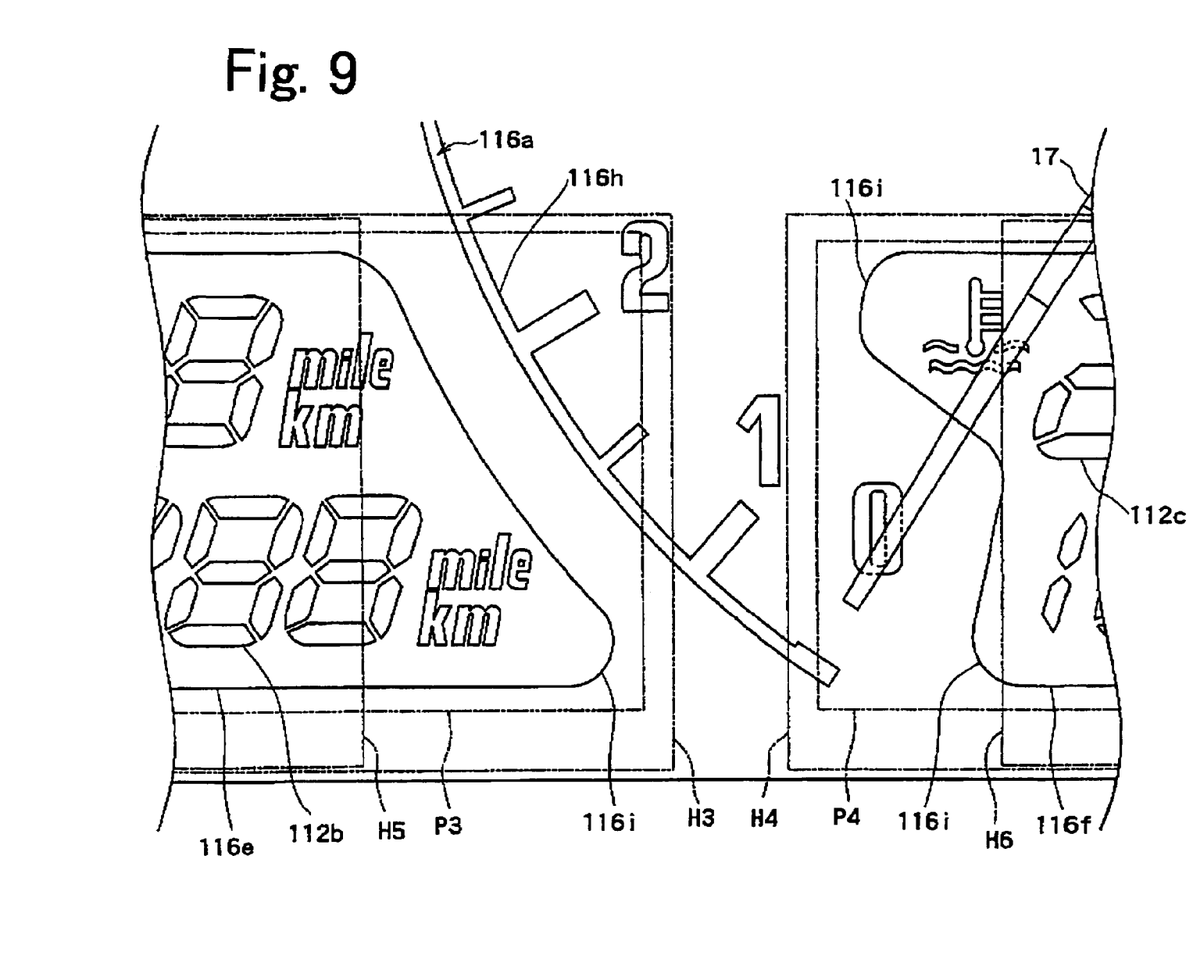
FIG. 9 is an expanded front view illustrating a vehicle displaying apparatus associated with a comparison example.

More specifically, for example, provided that the rectangular liquid crystal displaying plates P3, P4 are provided corresponding to the windows 116e, 116f as in the comparison example 2 as indicated by a two-dot chain line in FIG.

9, the liquid crystal displaying plates P3, P4 overlap the extension section 116h, so that the optically transparent displaying section 116a can not be provided in close the vicinity to the windows 116e, 116f.

Since in the foregoing comparison example 2, the liquid crystal holding members H3, H4 for positioning and holding the liquid crystal displaying plates P3, P4 are provided on the peripheral edges of the liquid crystal displaying plates P3, P4 to intercept the illumination light, it is necessary to dispose the optically transparent displaying section 116a while separating from the windows 116e, 116f.

Further, it is difficult in the foregoing comparison example 2 to cut the peripheral edges of the liquid crystal displaying plates P3, P4 such that the peripheral edges are recessed inwardly in order to bring the optically transparent displaying section 116a into close contact with the windows 116e, 116f, and further it is difficult to make the liquid crystal displaying plates P3, P4 while matching them to the configuration of the window having an acute angle section 116i.

For this, provided that the liquid crystal displaying plates P3, P4 are provided corresponding to the window as in the comparison 2, it is impossible to dispose the optically transparent displaying section 116a around the windows 116e, 116f having a configuration different from a square, and hence the flexibility of the design is lowered.

Furthermore, provided that the liquid crystal holding members H5, H6 are provided while being separated from the extended displaying section 116h as in the comparison example 3 as indicated by a one-dot chain line in FIG. 9, for example, the window 116e and the window 116f must be separated.

However, provided that the displaying apparatus 210 in the present embodiment 2 is employed, there is cut out the overlapping edge correspondence section 23a corresponding to the overlapping edge section 111b overlapping the optically transparent displaying section 116a and the extension section 116h in the liquid crystal holding member 23 which transits the illumination light by cutting out the polarizing plates 113, 114 overlapping the extension section 116h of the optically transparent displaying section 116a and which is provided on the peripheral edge to position and hold the liquid crystal displaying plate 111, so that the extension section 116h can be illuminated with the illumination light.

For this, in accordance with the displaying apparatus 210 in the present embodiment 2, it is possible to dispose the optically transparent displaying section 116a on the windows 116e, 116f with desired configurations while bringing the former optically transparent displaying section 116a to close the vicinity to the windows. Thus, the flexibility of the design can be improved.

"Modified Example"

Figure 10:
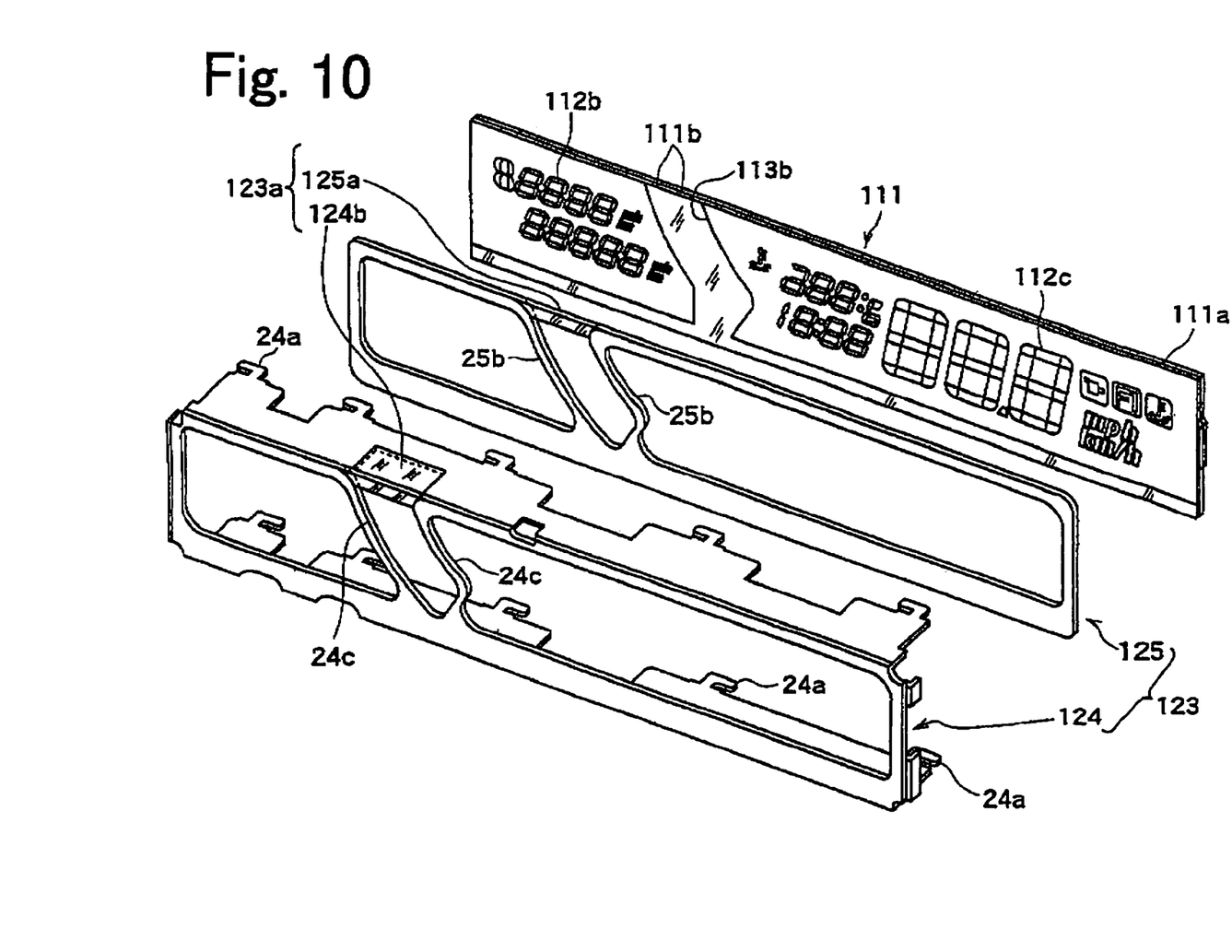
FIG. 10 is a partial perspective view illustrating the vehicle displaying apparatus associated with a modified example of the embodiment 2 of the present invention.

Referring to FIG. 10 there is illustrated a modified example of the embodiment 2.

Same symbols shall be applied to the same or equal portions as those in the embodiment 2 for the description of the modified example.

As illustrated in FIG. 10, in the present embodiment, an overlapping edge correspondence section 123a overlapping the overlapping edge section 111b of the liquid crystal holding member 123 is constructed with optically transparent members 125a, 125b.

The optically transparent member 123a comprises the frame optically transparent section 124b provided at a position corresponding to the overlapping edge section 111b of the frame 124, and the packing optically transparent section 125a provided at a position corresponding to the overlapping edge section 111b of the packing 125.

The optically transparent member 123a comprises a colorless transparent material, which can transmit the foregoing illumination light.

Even when the overlapping edge correspondence section 123a is constructed with the optically transparent members 125a, 124b, the extension section 16h of the foregoing optically transparent displaying section 116a can be illuminated by permitting the foregoing overlapping edge correspondence section 123a to transmit the illumination light.

Accordingly, even when the displaying apparatus 210 in the present modified example is employed, it is possible to overlap the peripheral edge 111a of the liquid crystal displaying plate 111 on the optically transparent displaying section 116a, and dispose the optically transparent displaying section 116a in the windows 116e, 116f with desired configurations while bringing it to the vicinity to the latter for an improvement of the flexibility of the design.

Accordingly, even when the displaying apparatus 210 in the present modified example is employed, it is possible to overlap the peripheral edge 111a of the liquid crystal displaying plate 111 with the optically transparent displaying section 116a, and is possible to dispose the optically transparent displaying section 116a while bringing the optically transparent displaying section 116a in the vicinity to the windows 116e, 116f with desired configurations. Hereby, the flexibility of the design is improved.

Since the liquid crystal displaying sections 112b, 112c are exposed from the windows 116e, 116f, only the one liquid displaying plate 111 striding at least the windows 116e, 116f may be employed, and hence the liquid crystal displaying plate 111 with a small area can be adopted, and the manufacturing cost can be reduced.

Furthermore, since in the present modified example the overlapping edge correspondence section 123a of the liquid crystal holding member 23 is structured with the optically transparent members 125a, 14b, it is prevented for the rigidity of the liquid crystal holding member 23 from being decreased even when the illumination light is adapted to transmit the overlapping edge correspondence section 123a.

Additionally, the overlapping peripheral edge 111b of the liquid crystal displaying plate 111 can be energized to securely position and hold the liquid crystal displaying plate 111.

Other constructions, operations, and effects are same or equal to those in the aforementioned embodiment 2, and hence the description thereof will be omitted.

This application claims priority from Japanese Patent Application 2003-011327, filed Jan. 20, 2003, which is incorporated herein by reference in its entirety.

What is claimed is:

1. A displaying apparatus, comprising:
a liquid crystal displaying plate including a liquid crystal plate and a polarizing plate;
a light source disposed on a back side of said liquid crystal displaying plate for emitting illumination light; and
a dial plate disposed on the front side of said liquid crystal displaying plate and including an optically transparent displaying section capable of transmission of light,
said dial plate including a window provided therein for exposing a liquid displaying section provided on said liquid crystal displaying plate, and said illumination light illuminating said optically transparent displaying section by passing through said liquid crystal displaying plate, wherein said polarizing plate includes a cut out at a portion corresponding to said optically transparent displaying section.

2. The displaying apparatus according to claim 1, wherein said liquid crystal displaying plate covers the whole of a back surface of said optically transparent displaying section.

3. The displaying apparatus according to claim 1, wherein a peripheral edge of said liquid crystal displaying plate has an overlapping edge section overlapping said optically transparent displaying section as viewed from the front.

4. The displaying apparatus according to claim 1,
wherein a peripheral edge of said liquid crystal displaying plate has an overlapping edge overlapping said optically transparent displaying section as viewed from a front, and
further comprising a liquid crystal holding member for holding said peripheral edge
wherein said liquid crystal holding member comprising an optically transparent member at a portion thereof overlapping said overlapping edge as viewed from the front.

5. A displaying apparatus comprising:
a liquid crystal displaying plate including a liquid crystal plate and a polarizing plate;
a light source disposed on a back side of said liquid crystal displaying plate for emitting illumination light;
a dial plate disposed on the front side of said liquid crystal displaying plate and including an optically transparent displaying section capable of transmission of light;
a resilient packing; and
a frame that includes a holding portion for holding said displaying apparatus together,
wherein said resilient packing is disposed between said frame and said liquid crystal displaying plate,
said dial plate and said resilient packing each including a window provided therein for exposing said liquid crystal displaying plate, and
said illumination light illuminating said optically transparent displaying section by passing through said liquid crystal displaying plate,
said polarizing plate including a window aligned with said window of said dial plate and said window of said resilient packing,
wherein said holding portion of said frame includes an optical transparent member that comprises a colorless transparent material.

6. The displaying apparatus according to claim 5, wherein said optical transparent member comprises:
a frame optically transparent section provided at a position corresponding to an overlapping edge section of said frame; and
a packing optically transparent section provided at a position corresponding to an overlapping edge section of said resilient packing.

7. The displaying apparatus according to claim 5,
wherein the optical transparent member is disposed substantially perpendicular to a surface corresponding to the optically transparent displaying section of said dial plate.

8. The displaying apparatus according to claim 1, wherein the optically transparent displaying section is formed into a generally circular arc shape and the cutout of the polarizing plate extends along the circular arc shape of the optically transparent displaying section.

9. The displaying apparatus according to claim 3, further comprising:
a liquid crystal holding member for holding said peripheral edge,
wherein the liquid crystal holding member is cut out at a portion overlapping the overlapping edge section as viewed from the front.

* * * * *